(12) United States Patent
Imhof et al.

(10) Patent No.: US 6,228,340 B1
(45) Date of Patent: May 8, 2001

(54) METHOD FOR THE PRODUCTION OF MACROPOROUS CERAMICS

(75) Inventors: Arnout Imhof, Utrecht (NL); David J. Pine; Fred F. Lange, both of Santa Barbara, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 09/139,783

(22) Filed: Aug. 25, 1998

Related U.S. Application Data

(60) Provisional application No. 60/056,805, filed on Aug. 25, 1997.

(51) Int. Cl.$^7$ ..................................................... C01B 33/12

(52) U.S. Cl. ........................... 423/338; 423/608; 423/610; 501/12; 501/80; 501/103; 501/133

(58) Field of Search ..................................... 423/338, 608, 423/610; 210/500.21, 500.25, 510.1; 501/12, 80, 103, 133

(56) References Cited

U.S. PATENT DOCUMENTS

| | | |
|---|---|---|
| H915 | 5/1991 | Gibbs . |
| 4,040,990 | 8/1977 | Neely . |
| 4,070,286 | 1/1978 | Iler et al. . |
| 4,105,426 | 8/1978 | Iler et al. . |
| 4,225,682 | 9/1980 | O'Neal . |
| 4,281,233 | 7/1981 | Coupek et al. . |
| 4,564,556 | 1/1986 | Lange . |
| 4,568,706 | 2/1986 | Noetzel et al. . |
| 4,581,219 | 4/1986 | Imada et al. . |
| 4,652,411 | 3/1987 | Swarr et al. . |
| 4,683,161 | 7/1987 | Rice et al. . |
| 4,761,232 | 8/1988 | Rice et al. . |
| 4,839,402 | 6/1989 | Stevens . |
| 4,908,338 | 3/1990 | Ross et al. . |
| 4,957,886 | 9/1990 | Mathers et al. . |
| 4,962,133 | 10/1990 | Chromecek et al. . |
| 4,999,323 | 3/1991 | Sang et al. . |
| 5,030,391 | 7/1991 | Sumita et al. . |

(List continued on next page.)

FOREIGN PATENT DOCUMENTS 62-123032   4/1987   (CN) .

OTHER PUBLICATIONS

Bibette, J., "Depletion Interactions and Fractionated Crystallization for Polydisperse Emulsion Purification", Journal of Colloid and Interface Science, 147(2):474–478 (1991).

Schacht, S. et al., "Oil–Water Interface Templating of Mesoporous Macroscale Structures", Science, 273: 768–771 (1996).

Huo, Q. et al., "Preparation of Hard Mesoporous Silica Shperes", Chemical Materials, 9(1): 14–17 (1997).

Kresge, C.T. et al., "Ordered Mesoporous Molecular Sieves Synthesized by a Liquid–Crystal Template Mechanism", Nature, 359: 710–712 (1992).

(List continued on next page.)

*Primary Examiner*—Paul Marcantoni
(74) *Attorney, Agent, or Firm*—Fulbright & Jaworski

(57) ABSTRACT

Macroporous ceramics were produced using the droplets of an emulsion as the templates around which the ceramic is deposited through a sol-gel process. Subsequent aging, drying and calcination yields a ceramic with pores in the range of 0.1 to several micrometers which have been left behind by the droplets. The unique deformability of the droplets prevents cracking and pulverization during processing and allows one to obtain porosities in excess of 74%. By starting with a monodisperse emulsion (produced through a repeated fractionation procedure) pores with a uniform and controllable size have been obtained. Self-assembly of these droplets into a colloidal crystal leads to ceramics which contain ordered arrays of pores. A wide range of porosities is obtainable with the advantages of low-temperature sol-gel processing, with a high degree of control and low cost.

15 Claims, 9 Drawing Sheets

U.S. PATENT DOCUMENTS

| | | | |
|---|---|---|---|
| 5,063,179 | | 11/1991 | Menashi et al. . |
| 5,071,635 | | 12/1991 | Yamanaka et al. . |
| 5,079,208 | | 1/1992 | Lammers et al. . |
| 5,082,607 | | 1/1992 | Tange et al. . |
| 5,100,871 | | 3/1992 | Chen et al. . |
| 5,112,676 | | 5/1992 | Cot et al. . |
| 5,130,343 | | 7/1992 | Frechet et al. . |
| 5,145,602 | | 9/1992 | Kissel . |
| 5,171,720 | * | 12/1992 | Kawakami ............................. 501/80 |
| 5,214,095 | | 5/1993 | Lavoie . |
| 5,215,952 | | 6/1993 | Bielmeier et al. . |
| 5,260,002 | | 11/1993 | Wang . |
| 5,288,763 | | 2/1994 | Li et al. . |
| 5,300,604 | | 4/1994 | Nasman et al. . |
| 5,306,561 | | 4/1994 | Frechet et al. . |
| 5,312,571 | * | 5/1994 | Pujari et al. ............................ 264/13 |
| 5,462,990 | | 10/1995 | Hubbell et al. . |
| 5,492,870 | | 2/1996 | Wilcox et al. . |
| 5,522,717 | | 6/1996 | Matsumoto et al. . |
| 5,539,071 | | 7/1996 | Steffler . |
| 5,583,162 | | 12/1996 | Li et al. . |
| 5,591,380 | | 1/1997 | Wright . |
| 5,696,042 | * | 12/1997 | Matsuura et al. .................... 501/97.1 |
| 5,698,483 | * | 12/1997 | Ong et al. ............................... 501/12 |
| 5,773,103 | * | 6/1998 | Ciora, Jr. et al. .................... 428/346 |
| 5,840,111 | * | 11/1998 | Wiederholf et al. ................. 106/436 |
| 5,897,849 | * | 4/1999 | Alcaraz et al. ........................ 501/80 |

OTHER PUBLICATIONS

Beck, J.S. et al., "A New Family of Mesoporous Molecular Sieves Prepared with Liquid Crystal Templates", Journal of the American Chemical Society, 114: 10834–10843 (1992).

Flaugh, P.L. et al., Development of a New Optical Wavelength Rejection Filter: Demonstration of its Utility in Raman Spectroscopy, 38(6): 847–850 (1984).

Yablonovitch, E., "Photonic Band–Gap Structures", Journal of the Optical Society of America B, 10(2): 283–295 (1993).

Pusey, P.N. et al., "Phase Behaviour of Concentrated Suspensions of Nearly Hard Colloidal Spheres", Nature, 320(6060): 340–342 (1986).

Dinsmore, A.D. et al., "Entropic Control of Particle Motion Using Passive Surface Microstructures", Nature, 383: 239–342 (1996).

Van Blaaderen, A. et al., "Template–Directed Colloidal Crystallization", Nature 385: 321–324 (1997).

Hachisu, S. et al., "Optical Demonstration of Crystalline Superstructures in Binary Mixtures of Latex Globules", Nature, 283: 188–189 (1980).

Bartlett, P. et al., "Superlattice Formation in Binary Mixtures of Hard–Sphere Colloids", Physical Review Letters, 68(25): 3801–3804 (1992).

Sanchez, C. et al., "Chemical Modifications of Titanium Alkoxide Precursors", Spectrochimie Du Solide, Universite Pierre Et Marie Curie, Paris France (No date available).

Antonelli, D.M. et al., "Synthesis of Stable Hexagonally Packed Mesoporous Niobium Oxide Molecular Sieve Through a Novel Ligand–Assisted Templating Mechanism", Agnew. Chem. Int. Ed. Engl., 35(4): 426–430 (1996).

Fujiu, T. et al., "Processing and Properties of Cellular Silica Synthesized by Foaming Sol–Gels", Journal of the American Ceramic Society, 73(1): 85–90 (1990).

Wu, M. et al., "Synthesis of Cellular Inorganic Materials by Foaming Sol–Gels", Journal of Non–Crystalline Solids, 121: 407–412 (1990).

Garino, T.J. et al., "Photolithographic Patterning of Particular Films", Journal of the American Ceramic Society, 70(11): C–311–C–314 (1987).

Garino, T.J. et al., "Deposition and Sintering of Particle Films on a Rigid Substrate", Journal of the American Ceramic Society, 70(11): C–315–C–317 (1987).

Philipse, A.P. et al., "Solid Opaline Packings of Colloidal Silica Spheres", Journal of Material Science Letters, 8: 1371–1373 (1989).

* cited by examiner

METHOD FOR THE PRODUCTION OF MACROPOROUS CERAMICS

CROSS-REFERENCE TO RELATED APPLICATIONS

This application claims an invention disclosed in Provisional Application Ser. No. 60/056,805, filed Aug. 25, 1997, and claims the benefit of said provisional application pursuant to 37 CFR §1.78(a)(3).

FIELD OF THE INVENTION

This invention is in the field of porous ceramics.

BACKGROUND OF THE INVENTION

Ceramics with controlled porosity find wide applications as catalytic surfaces and supports, adsorbents, chromatographic materials, filters, light weight martials, and thermal and acoustic insulators. In catalytic applications the macropores facilitate material transport to the nanoporous internal regions where reactions can take place. Macroporous silica could be of substantial use as insulating layers in integrated circuits. The low dielectric constant of this material lowers the capacity of the chips which makes them faster. Furthermore, ceramics with regular arrays of pores have unique optical properties such as optical filters which have strong wavelength dependent reflectivity and transmission. They are also candidates for photonic band gap materials. See Yablonovitch, E. *J. Opt. soc. Am.* B 10, 2830295 (1993); and Joannopoulos, J. D., Meade, R. D. & Winn, J. N. *Photonic Crystals: Molding the Flow of Light*, 1–137 (Princeton University Press, Princeton, 1995).

Porous materials are commonly categorized according their (average) pore size. Microporous materials have pore diameters $\leq 2$ nm, mesoporous ones have pores in the range of about 2–50 nm, and macroporous materials contain pores $\geq 50$ nm. See IUPAC Manual of Symbols and Terminology, Appendix 2, Part 1, Colloid and Surface Chemistry, *Pure Appl. Chem.* 31, 578 (1972). An extension of these materials to the mesoporous regime is provided by the class of materials known as MCM-41. These mesostructures have channel diameters of 2–10 nm and thus are the extension of zeolites, with pore diameters <2 nm. However, control over the size, shape, and ordering of pores larger than 10 nm has remained a challenge. See J. C. Jansen, M. Stöcker, H. G. Karge, and J. Weitkamp (editors), *"Advanced Zeolite Science and Applications"*, Studies in Surface Science, Vol. 85, (Elsevier, Amsterdam, 1994); C. T. Kresge et al., *Nature* 359, 710 (1992); and J. S. Beck et al., J. Am. Chem. Soc. 114, 10834 (1992); J. S. Beck et al., U.S. Pat. No. 5,108,725 (1992). These aluminosilicates are prepared through a liquid crystal mechanism in which a sol-gel process takes place in the interstitial regions of an ordered surfactant phase formed by self-assembly of rodlike micelles acting as templates. See Krauss, T., Song, Y. P., Thomas, S., Wilkinson, C. D .W. & DelaRue, R. M. *Electron. Lett.* 30, 1444–1446 (1994). This results in cubically or hexagonally ordered pores, the size of which can be controlled by varying the surfactant and the amount of solubilized additives. Pore sizes are in the range of 1–10 nm. This class of materials has been extended with a number of transition metal oxides. See D. M. Antonielli and J. Y. Ying, *Angew. Chem. Intl. Ed. Engl.* 34(18), 2014 (1995); 35(4), 426 (1996).

For larger pore sizes, most notably in the macroporous regime, no method is known to produce ceramics containing periodic pores. It has been possible, however, to produce pores with a well-defined (spherical) shape, namely by the foaming method and by the hollow sphere sintering method. The first method uses a colloidal sol or a powder slurry containing a surfactant which is foamed with a gas and then gelled by a sol-gel reaction. See T. Fujiu, G. T. Messing, and W. Huebner, *J. Am. Ceram. Soc.* 73(1), 85 (1990); M. Wu, T. Fijiu, and G. L. Messing, *J. Non-Cryst. Solids* 121, 407 (1990). In the second method, hollow microspheres are first blown out of a molten oxide (e.g. glass) which are then sintered together or incorporated into a ceramic matrix. For a review, see R. L. Downs, M. A. Ebner, and W. J. Milner, In: L. C. Klein (Ed.), *"Sol-Gel Technology for Thin Films, Fibers, Performs, Electronics, and Specialty Shapes"*, (Noyes Publications, Park Ridge, N.J., 1988), pp 330–381. In both cases large pores are produced in the range of roughly 10 to 1000 $\mu$m. Pore sizes are generally broadly distributed and do not allow for assembly into regular lattices.

Finally, some colloidal microspheres (most notably silica) can be made sufficiently monodisperse such that they form regular (cubic) arrays under the right circumstances. These packings can then be sintered to a ceramic. See T. J. Garino and H. K. Bown, *J. Am. Cera. Soc.*70, C311, C315 (1987); A. P. Philipse, *J. Mater. Sci. Lett.* 8(12), 1371 (1989). Porosities of these packings are low, however (around 26%), and not easily controlled.

SUMMARY OF THE INVENTION

The present invention enables the production of porous ceramics in which the pore size is controlled and can be varied continuously in, the range of 0.05 $\mu$m to 5 $\mu$m, preferably from one tenth to three micrometers, and the pore size distribution can also be varied as desired.

The invention uses droplets broadly of an aqueous or nonaqueous emulsion as templates around the exterior surface of which material is deposited through a sol-gel process. Subsequent drying and heat treatment yields materials with spherical pores left behind by the emulsion droplets. It is preferred to use nonaqueous emulsions, and as an embodiment of the invention, an oil-immiscible polar liquid was used to replace water using existing surfactants.

By starting with an emulsion of equally-sized droplets (produced through a repeated emulsion fractionation procedure), pores with a uniform and controllable size are obtained. A small amount of a totally insoluble material, such as silicone oil, is added to the oil phase to limit Ostwald ripening. Self-assembly of these droplets into a colloidal crystalline phase leads to a ceramic which contains an ordered array of pores. A narrow size distribution enables the pores to be highly ordered, reflecting the self-assembly of the original monodisperse emulsion droplets into a nearly crystalline array. See Pusey, P. N. & van Megen, W. Phase Behavior of Concentrated Suspension of Hard Colloidal Spheres. *Nature* 320, 340–342(1986). Binary crystals (alloy structures) are also possible in the case of a suitably chosen mixture of monodisperse droplets with a different size. The method takes advantage of the fact that the droplets are both highly deformable and easily removable, which prevents the gel from cracking as it becomes stressed during, respectively, aging and drying. Furthermore, emulsions can be made with droplet volume fractions from near zero to as high as 99%. The emulsion fractionation procedure is known and enables one to separate droplets according to their size, thus allowing perfect control over the size and size distribution of the pores in the resulting material.

DETAILED DESCRIPTION

Figure 1:
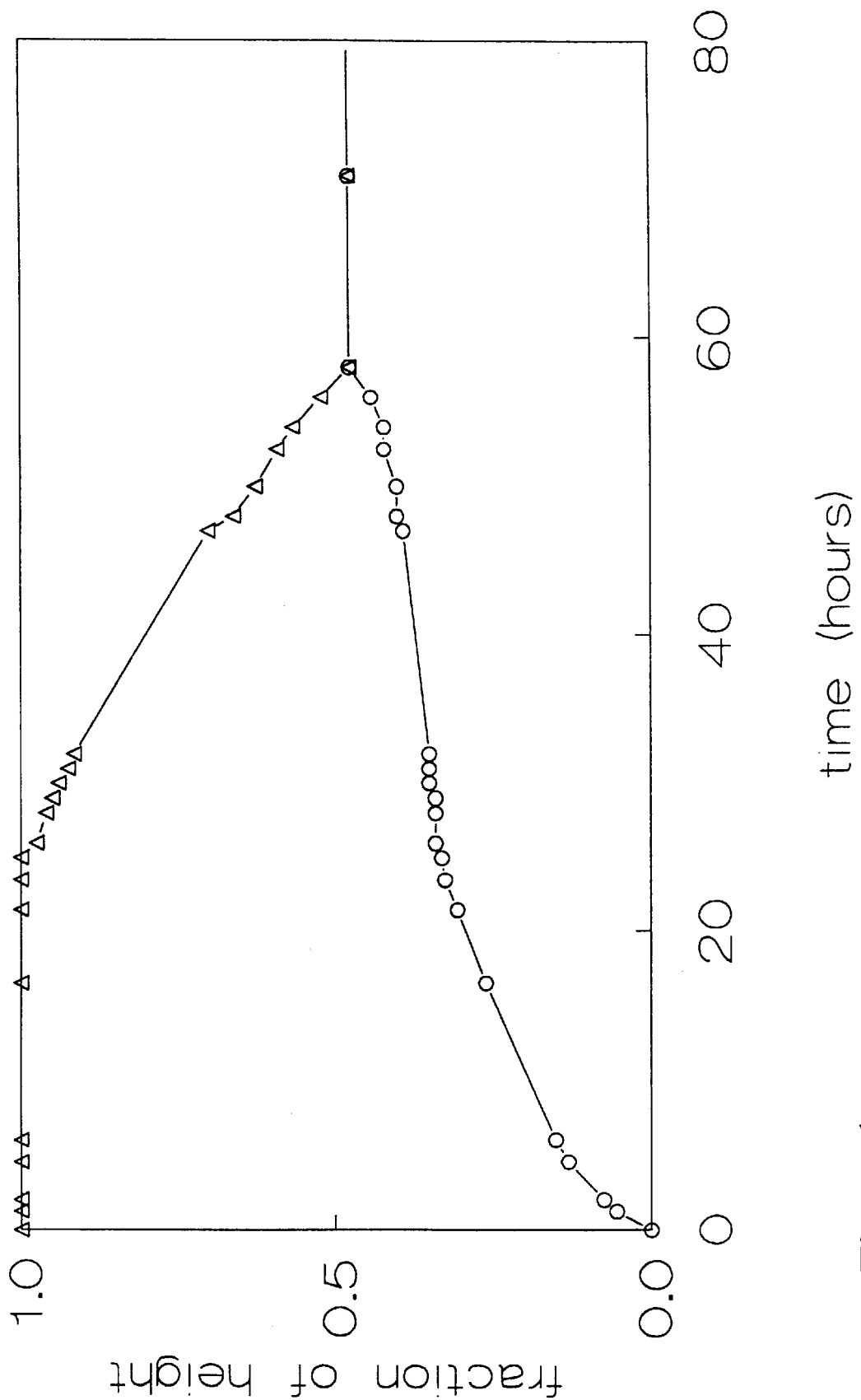
FIG. 1 is a plot showing the history of a decane in formamide (FA) emulsion stabilized with a 1:1 mixture of A05 and A010, wherein triangles indicate the boundary of oil separation, circles indicate the creaming boundary.

The techniques of the present invention can be applied to a variety of metal oxides, binary metal oxides, and even organic polymer gels, with pore sizes that can be varied continuously in the range of 0.05 $\mu$m to 5 $\mu$m. The method takes advantage of the fact that the oil droplets are both highly deformable and easily removable. The high deformability allows the inorganic gel to accommodate large shrinkage, which prevents cracking and pulverization during aging and drying. Furthermore, droplet volume fractions can exceed the close-packing limit of 74%. since emulsions are made of liquids, the droplets are easily removed by evaporation or dissolution after the templating has been accomplished. The versatility of this technique offers many advantages over existing routes for the production of macroporous material, which are limited to widely nonuniform, or irregularly shaped pores, and therefore do not offer the possibility of ordered porosity. See Wu, M. X., Fijiu, T. & Messing, G. L. Synthesis of Cellular Inorganic Materials by Foaming Sol Gels. *J. Non-Cryst. Sol. Solids* 121, 407–412 (1990); and Walsh, D. & Mann, S. Fabrication of Hollow Porous Shells of Calcium Carbonate from Self-Organizing Media. *Nature* 377, 320–323 (1995). Moreover, other techniques are not readily adapted to produce a wide variety of porous materials.

The basic idea is to use sol-gel processing to deposit an inorganic material (e.g., a metal oxide) at the exterior of the droplets in an emulsion. Current sol-gel processes make use of metal alkoxides dissolved in a lower alcohol and hydrolyzed by the controlled addition of water. (The alcohol is needed as a solvent because its intermediate polarity makes it a good solvent for both the apolar alkoxide and the polar water). This produces a sol of nanometer-sized particles of the corresponding metal oxide. Further aging of the sol at predetermined pH and temperature causes growth and aggregation of the particles resulting in gelation. Drying and heat treatment then produce the metal oxide by removing the solvent and residual organics.

The procedure is applicable broadly to both aqueous and nonaqueous emulsions, limited only by the inherent stability of the precursor in the continuous phase (i.e., the non-oil phase). For materials such as silicon dioxide, one can form satisfactory gelable emulsions with water as the continuous phase and the techniques described hereafter are fully applicable to such aqueous emulsions.

Unfortunately, many metal precursor oxides will prematurely gel in water. The principal difficulty is that many metal oxides are extremely reactive with water and therefore are incompatible with aqueous emulsions. Another difficulty is that large amounts of alcohol will destroy an emulsion because of its tendency to mix both oil and water. Thus, emulsion templating poses two difficulties: first, to find a stable emulsion in which water is replaced by another polar liquid and second, to find a method to do the sol-gel processing in this polar liquid instead of an alcohol.

Development of Nonaqueous Emulsions

An emulsion is a system in which one fluid is dispersed in another with which it is immiscible. Macroscopic separation of the phases is prevented by the addition of a suitable surfactant. In the vast majority of emulsion research one of the liquids has been water. Nonaqueous emulsions, however, could replace regular aqueous emulsions wherever the presence of water is undesirable. For example in cleaning of systems that are sensitive to formation of rust, for example, engines and other mechanical systems, or for doing sol-gel processes with hydrolyzable metal alkoxides in organized media in a controlled way. Only occasional reports on nonaqueous emulsions have appeared. See Periard, J., Banderet, A., and Reiss, G., *Polym. Lett.* 8, 109 (1970); Reiss, G. *Makromol. chem. Suppl.* 13, 157 (1985); Nixon, J. and Beerbower, a., *Am. Chem. Soc. Div. Petrol. Chem. Preprints* 14, 49 (1969); and Cameron, N. R. and Sherrington, D. C., *J. Chem. Soc. Faraday Trans.* 92(9), 1543 (1996).

Two strategies can be considered when searching for stable nonaqueous emulsions. One of these is to design surfactants which have two incompatible blocks, each of which is soluble selectively in one of two selected immiscible liquids. In this way two-block copolymers of polystyrene and polyisoprene were able to stabilize DMF/hexane emulsions for almost 24 hours. See Periard et al. supra. The other approach is to find suitable oil-immiscible polar liquids that can replace water using existing surfactants (which have been designed to work well with water). Thus, nonionic surfactants with hydrophilic-lipophilic balance (HLB)-numbers around 12 were found to stabilize oil-in-formamide emulsions. See Nixon et al supra. and Cameron et al., supra.

The first approach has the drawback of necessitating the specific design and characterization of a new surfactant for each combination of liquids. In this work we therefore chose the second approach.

A liquid capable of replacing water in an emulsion should have a high polarity to make it immiscible with oils and to make it a good solvent for the hydrophilic part of surfactant molecules. Furthermore, hydrogen bonding is expected to play a role in solvating both ionic and nonionic surfactants and in the formation of a hydrogen-bonded network in the liquid itself. The influence of these factors was investigated by examining emulsion stability for a variety of polar liquids in combination with surfactants over a range of HLB-numbers.

The composition and type of the oil is shown to play an important role as well. We have found that Ostwald ripening plays an even more important role in nonaqueous emulsions than in aqueous emulsions. Using the insights gained we were able to make high internal phase oil-in-polar liquid emulsions that are stable indefinitely.

Nonaqueous Emulsion Examples a. Materials

Polar solvents we used were water (deionized), formamide (FA, Aldrich 99.5+%), N-methylformamide (NMF, Aldrich 99%), N,N'-dimethylformamide (DMF, Fisher, A.C.S. reagent), dimethylsulfoxide (DMSO, Fisher, A.C.S. reagent), methanol (Fisher, A.C.S. reagent), and acetonitrile (Fisher, A.C.S. reagent). Oils we used were decane (Aldrich, 99+%) and silicone oil (Fisher, boiling point >200° C., density determined at 0.959 g/ml).

The non-ionic surfactants were all obtained from Aldrich. The polyoxyethylene alkyls are designated bij A–n, wherein n is the (average) number of oxyethylene units in the chain. Brij 52 (n=2, HLB-5.3), Igepal CO-520 (n=5, HLB=10.5), Triton X-100 (n=10, HLB=13.6), Brij 35 (n=HLB=16.9), Igepal CO-890 (n=40, HLB=17.9), and Igepal CO-990 (n=100, HLB=19.1). The triblock copolymer surfactants polyoxyethylene-polyoxypropylene-polyoxyethylene different in their (number averaged) molecular mass $M_n$ and their polyoxyethylene content (% EO as a fraction of the molecular mass by weight). They will be designated as EaPbEa, where 2a is the number of oxyethylene units (E) and b the number of oxypropylene units (P). HLB numbers were assigned to them in the usual way, by dividing the weight percentage EO by 5. Nace, V. M. (Ed.), "Noinionic Surfactants: Polyoxyalylene block copolymers", Surfactant Science Series Vol. 60, Marcel Dekker, New York, 1996). The surfactants used were E3P43E3 ($M_n$=2800, 10% EO, HLB=2), E20P70E20 ($M_n$=5800, 30% EO, HLB=6), and E76P29E76 ($M_n$=8400, 80% EO, HLB=16). All surfactants were soluble in the polar liquids and insoluble in decane, with the exception of Brij 52 which was soluble only in the oil.

b. Methods

For the stability tests emulsions were prepared by placing 2.0 g of an 18.3 wt % solution of surfactant in polar solvent in a tall 8 ml vial and adding 2.0 ml of decane. This corresponds to an oil volume fraction of approximately 50%. The vial was then vigorously shaken by hand until a very viscous emulsion formed, and allowed to rest at a temperature of 21±0.5° C. The behavior of the emulsions was followed over time by noting the amount of creaming and breaking. The stability criterion used was the 'time until breaking', i.e. the time after which 5% of the total amount of oil was floating on the emulsion. All emulsions were tested at least twice in this way. The time until breaking was reproducible to about 20%. Some emulsions were prepared by passing the hand-shaken emulsions through a porous membrane (MSI, nylon, 0.45 μm pores) using a syringe. This generally led to smaller droplets but did not have a large effect on the time until breaking.

Droplet size distributions were determined using an optical microscope (Nikon MicroPhot-FX) and a digital camera. Emulsions used for these experiments were filtered though a membrane (nylon, 0.45 μm) in order to obtain a reproducible initial size distribution with small droplets. Samples were taken after specified times and diluted with the continuous phase by gentle stirring. In each population about 300–400 droplets were sized and a histogram of their diameters was made with 0.5 μm categories.

c. Results

In our search for solvents that can replace water to give nonaqueous emulsions we were led by considerations of the polarity and hydrogen bonding abilities. Related physical parameters are the dipole moment ($\mu$), relative permittivity ($\epsilon$) and Hildebrand cohesive energy density ($\delta_H^2$) which are given in Table I for the solvents used.

TABLE I

Physical parameters and Kamlet-Taft parameters of the polar solvents used.

|  | $\mu$(D) | $\epsilon$ | $\delta_H^2$ | $\alpha$ | $\beta$ | $\pi^*$ |
|---|---|---|---|---|---|---|
| water | 1.85 | 80 | 549 | 1.17 | 0.18 | 1.09 |
| FA | 3.73 | 110 | 362 | 0.71 | 0.60 | 0.97 |
| NMF | 3.83 | 184 | 259 | 0.62 | 0.80 | 0.90 |
| DMF | 3,86 | 37 | 139 | 0 | 0.69 | 0.88 |
| DMSO | 3.90 | 47 | 169 | 0 | 0.76 | 1.00 |
| methanol | 1.70 | 34 | 205 | 0.93 | 0.62 | 0.60 |
| acetonitri | 3.92 | 38 | 138 | 0.19 | 0.37 | 0.75 |

The Kamlet-Taft solvatochromic parameters $\alpha$, $\beta$, and $\pi$ are also shown in Table I. See Kamlet, J. M., J.-L M. Abboud, M. H. Abraham, and Taft, R. w., *J. Org. Chem.* 48, 2877 (1983); and Abraham, M. H., Grellier, P. M., Abboud, J.-L. M., Doherty, R. M., and Taft, R. W., *Can. J. Chem.* 66, 2673 (1988). They are normalized numbers for the neat solvent that express respectively the hydrogen bond donating ability, hydrogen bond accepting ability and the combination of polarity and polarizability. All solvents shown have high, though differing, values of $\mu$, $\epsilon$, $\delta_H^2$, and $\pi^*$ as demanded by the requirement of immiscibility with apolar liquids. Their hydrogen bonding acidity and basicity vary over a wide range. Solvents like DMF and DMFSO which have no hydrogen atom available for bonding have $\alpha$=0. The differences in the values of the parameters should help us to rationalize why one solvent can form stable emulsions similarly to water and why the other cannot.

In general, the emulsions showed two types of instability. The first was creaming caused by (upward) sedimentation of oil droplets. The other was breaking caused by coalescence of droplets which ultimately leads to complete separation of the two phases. The part of the sample volume which contains emulsified oil therefore has two boundaries. The upper boundary is due to oil loss at the top and the lower one is the sedimentation boundary. FIG. 1 shows the location of these boundaries as a fraction of the sample height over the course of time for an emulsion of decane droplets in formamide with a 1:1 (by weight) mixture of A-5 and A-10 as emulsifier. Thus, it represents a history of the emulsin's stability.

Initially, there is only a lower boundary due to creaming of oil droplets. This process always started immediately after preparation of the emulsions and is caused by the depletion mechanism. See Bibette, J., Roux, D., and nallet, F., *Phys.*

Rev. Lett. 65(19), 2470 (1990; and Bibette, J., *J. Colloid Interface Sci.* 147, 474 (1991). At emulsifier concentrations above the critical micelle concentration (cmc), there exist micelles in the continuous phase of the emulsion. These give rise to a depletion attraction between the oil droplets which is stronger than the larger the droplets. This induces a phase separation into a dilute phase enriched in small droplets and a concentrated phase enriched in large droplets. In this case the emulsifier concentration is high enough (18.3 wt % relative to the polar phase) to make even the smallest droplets separate to the concentrated (upper) phase. By lowering the surfactant concentration to the cmc it is possible to prevent this separation. Since we are interested in keeping the droplets emulsified we do not consider this an instability in this work.

In the case of the sample in FIG. 1, the second boundary appears only after most of the creaming has taken place. At this point the oil concentration inside the emulsion is about 75%. Of course, significant droplet coalescence may have occurred long before that point. This breaking instability is more serious in the sense that the emulsifier solution is no longer capable of keeping the oil emulsified. The point at which 5% of the oil has separated therefore serves as a suitable measure for the stability of the emulsion and is noted as the 'time until breaking'.

For each polar solvent a series of surfactants was investigated ranging from lipophylic to hydrophylic (HLB-scan). Intermediate HLB numbers were obtained by mixing two surfactants in a certain weight ratio. The mixture was assigned an HLB number equal to the weight average of the HLB numbers of the pure surfactants. See Becher, P. "Emulsions: Theory and Practice", 2nd Ed., Reinhold, N.Y., 1965. Decane was used as the oil phase, which made up 50% v/v of the emulsion. After shaking the sample, very viscous emulsions are obtained for water, FA, NMF, and DMSO. Table II shows the time until breaking for these solvents.

TABLE II

Time until breaking in hours for several nonaqueous emulsions. A time of zero means that no emulsion is formed. Emulsions contained 10.6 wt % of surfactant and 42.2 wt % of decane.

| surfactant | water | FA | NMF | DMS |
|---|---|---|---|---|
| Brij 52 | >500[a] | >500[a] | 0 | 0 |
| Brij 52/Igepal CO-520 = 20:1 | | 5[a,b] | | |
| Brij 52/Igepal CO-520 = 1:2 | | 0[b] | | |
| Igepal CO-520 | 0[b] | 15[b] | 0 | 0 |
| Igepal CO-520/Triton X-100 = 1:1 | | 25 | | 0 |
| Triton X-100 | >500 | 15 | 0 | 0 |
| Triton X-100/Igepal CO-890 = 2:1 | | 34 | | 0.5 |
| Triton X-100/Igepal CO-890 = 1:2 | | 53 | 0.058 | 0.7 |
| Igepal CO-890 | >500 | 41 | 0.050 | 0.5 |
| Igepal CO-890/Igepal CO-990 = 1:1 | | 51 | 0.033 | 0.6 |
| Igepal CO-990 | >500 | 41 | 0.025 | 0.8 |

[a]W/O type emulsion.
[b]Forms a microemeulsion.

DMF, methanol and acetonitrile did not show any tendency to form emulsions. It is clear that by far the most stable nonaqueous emulsions can be obtained with FA. However, they are not nearly as stable as aqueous emulsions. Emulsions with DMSO and NMF are even more fleeting.

Figure 2:
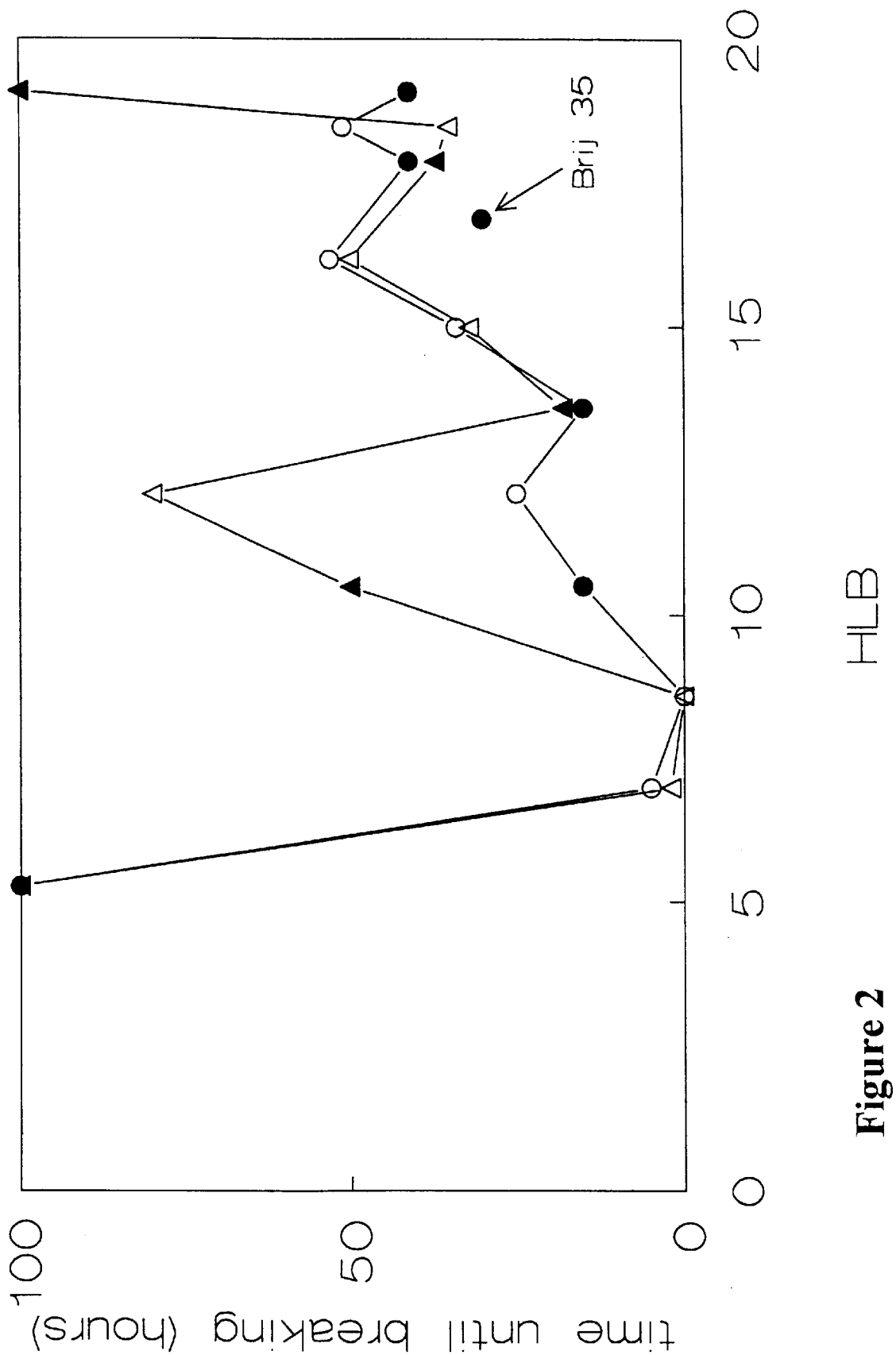
FIG. 2 is a plot of time until breaking versus the hydrophylic-lipophilic balance (HLB) for emulsions in formamide wherein circles indicate the oil is decane, triangles indicate the oil is decane+1% silicone oil, closed symbols indicate pure surfactants, and open symbols indicate mixtures (the points shown at 100 hours are at infinity)

A clear HLB dependency is observed for FA, but not for DMSO or NMF. In FIG. 2, the time until breaking is plotted vs. HLB for the formamide emulsions (circles). The overall trend seems to suggest that the optimum HLB number for oil-in-formamide emulsions is around 18 to 20. This is not in agreement with Cameron et al., supra where an optimum HLB of 12 was found. However, considering that the size of the surfactant molecules increases drastically with HLB in our series. another interpretation of the data suggests that the size of the surfactant molecules contributes to the stability. This is probably due to steric stabilization. FIG. 2 also clearly shows that surfactant mixtures (open symbols) form more stable emulsions than pure surfactants (filled symbols). An extra point for Brij 35 (HLB=16.9) was included in FIG. 2 to show that it falls within the trend for pure surfactants but below a mixture with a similar HLB number. We also found that surfactants with HLB numbers around 8 have a strong tendency to form microemulsions in formamide systems. Nonaqueous microemulsions have been investigated recently in a variety of nonpolar liquids among which is FA. See Ray, S. and Moulik, S. P.,*Langmuir* 10, 2511 (1994); Martino, a. and Kaler, E. W., *Langmuir* 11, 779 (1995). Like aqueous systems the O/W nature of the formamide emulsions changes to W/O below HLB≈8 (where O is oil and W stands for a polar liquid in general).

The foregoing experimental suggestion that large surfactant molecules are better stabilizers for formamide emulsions than low molecular weight surfactants led us to investigate the class of PEO-PPO-PEO triblock copolymer surfactants, which has received a lot of attention in recent years. See Nare, supra. The observed stability of emulsions with these surfactants is shown in Table III.

TABLE III

Time until breaking in hours for several nonaqueous emulsions using the triblock copolymers of EaPbEa. Emulsion compositions are the same as in Table II.

| surfactant | water | FA | NMF | DMSO |
|---|---|---|---|---|
| E3P43E3 | 0[a] | 23 | 0.017 | 2 |
| E3P43E3/E20P70E20 = 3:1 | | 150 | | 7 |
| E3P43E3/E20P70E20 = 1:1 | | 150 | 0.025 | 22 |
| E3P43E3/E20P70E20 = 1:3 | | >1000 | | 24 |
| E20P70E20 | >1000 | 200 | 0.033 | 23 |
| E20P70E20/ | | >1000 | | 30 |
| E20P70E20/ | | >1000 | 0.033 | 21 |
| E20P70E20/ | | 150 | | 20 |
| E76P29E76 | >1000 | 65 | 0 | 22 |

[a]soluble in both phases.

Emulsions with FA and DMSO remained stable much longer than the other emulsions, even though the polymer molecules are still of a relatively low molecular weight (<10$^4$). Some FA emulsions did not show any breaking even after a month. Furthermore, emulsions that did break did so only very slowly and retained a great deal of the oil for a long time. No improvement was found for NMF. DMF, methanol, and acetonitrile again did not form emulsions. All emulsions formed were of the O/W type. Even the most lipophylic PEO-PPO-PEO surfactant (with HLB=2) did not form a W/O emulsion. This may be due to the U-shape of this surfactant making it curve preferentially toward the oil phase. This time FA emulsions seem to have their optimum stability at an intermediate HLB number. Again, surfactant mixtures offer a stronger stabilizing capability. However, for DMSO and NMF no trend is observable, just like with nonpolymeric surfactants.

Although formamide emulsions with surfactant E20P70E20 appeared to be stable practically indefinitely, microscopic observations indicated that the average droplet size increased in time. We therefore analyzed the droplet size distribution at several times after preparation which shows the effect of Ostwald ripening on droplet size distributions. The initial state consisted of droplets formed by pushing a (coarse) emulsion through the 0.45 μm pores of a filter membrane. It is clear that the average droplet size as well as the width of the distribution both increase in time. Since the emulsion did not break even after a long time it seems unlikely that there is much droplet coalescence. In fact, we found that Ostwald ripening was responsible for the droplet growth. This process has been shown to be important inaqueous emulsions of lower alkanes. See Higuchi, W. I. and Misra, J., *J. Pharm. Sci.* 51, 459 (1962); Davis, S. S. and Smith, A. in "Theory and Practice of Emulsion Technology" (A. L. Smith, Ed.), Academic Press, London, 1976; and Buscal, R. Davis, S. S., and Potts, D. C., *Colloid & Polm. Sci.* 257, 636 (1979). Since the oil in small droplets is at a higher Laplace pressure it has a higher chemical potential and it is therefore slightly more soluble in the polar phase than the oil in the larger droplets. As a result, even at low solubilities oil diffuses from the small droplets to the large droplets at a noticeable rate. Theoretical analysis has shown that Ostwald ripening is a second order process and causes the mean droplet radius cubed to grow linearly in time, with the rate of increase being proportional to the oil solubility in the polar phase and to its diffusivity. See Lifshitz, I. M. and Slesov, V. V., *J. Phys. Chem. Solids* 19, 35 (1961). The linear relation has been confirmed experimentally. See Buscall et al. supra; Kabalnov, A. S., Makarov, K. N., Pertzov, A. V., and Shchukin, E. D.,*J. Colloid Interface Sci.* 138, 98 (1990).

Figure 3:
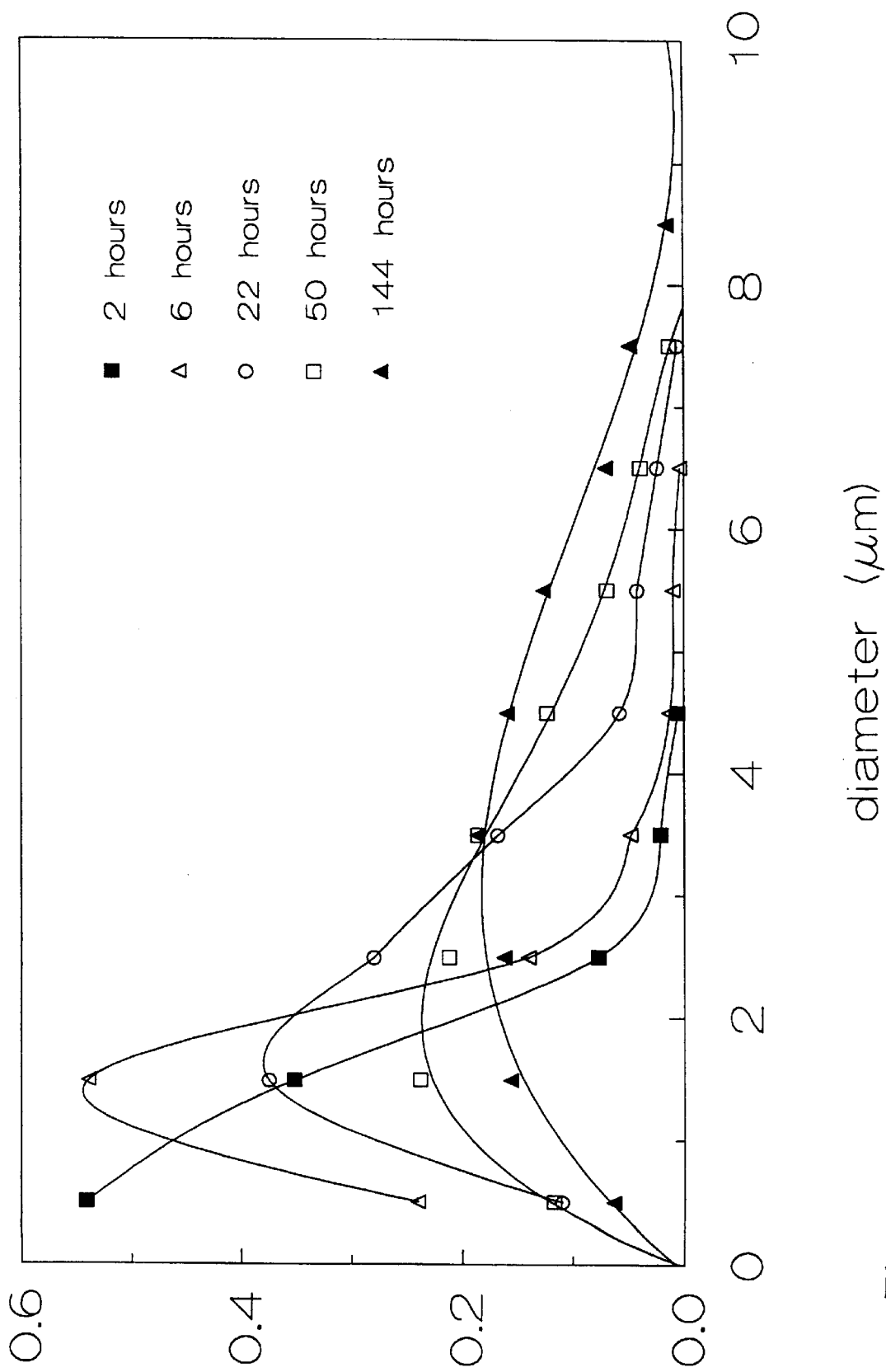
FIG. 3 is a plot showing the effect of Ostwald ripening on droplet size distributions of decane in FA emulsions at several times after preparation.
Figure 4:
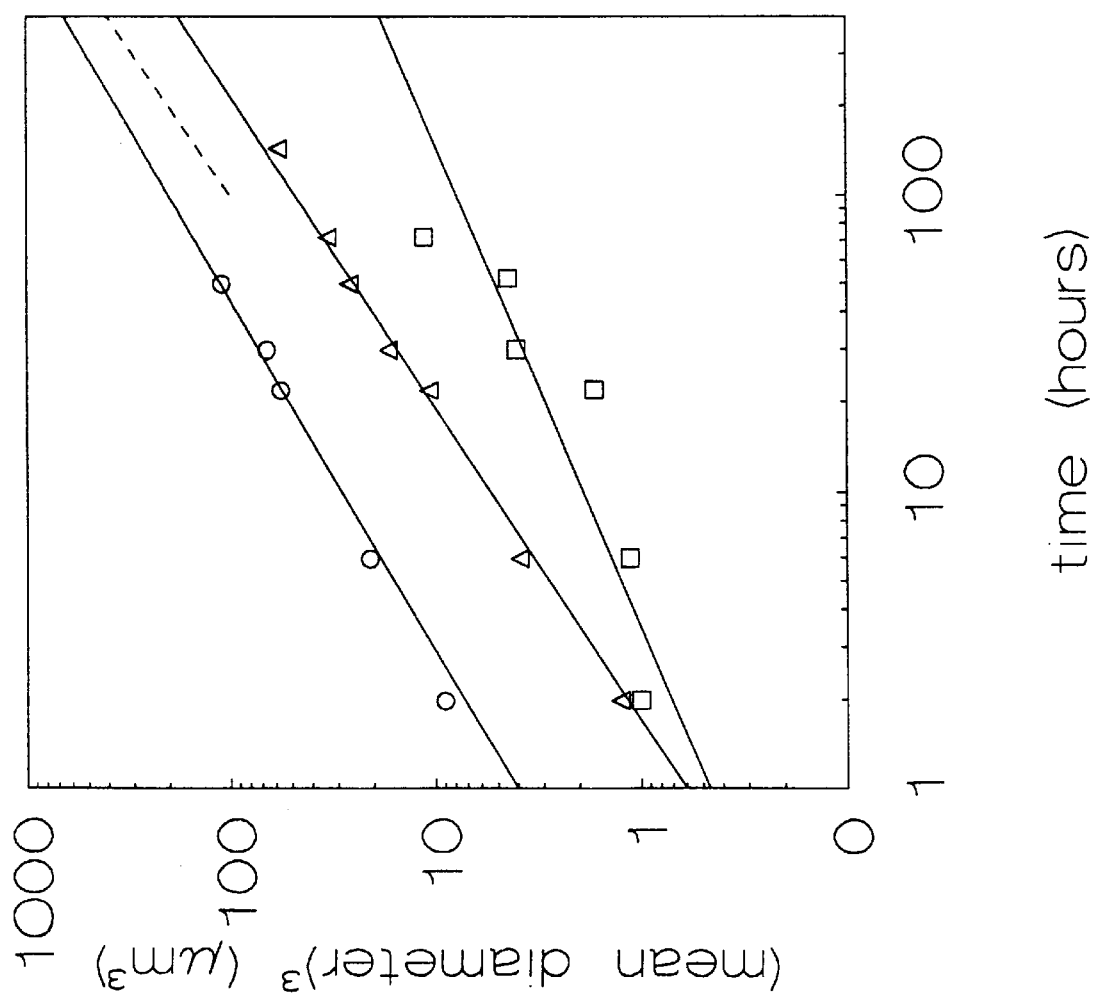
FIG. 4 is a plot showing the mean droplet diameter cubed versus time for decane in FA emulsions with surfactants wherein the circles indicate E76P29E76, the triangles indicate E20P70E20, the squares indicate E3P43E3, and the dashed line indicates a slope of unity.

In FIG. 4 we verified this for the data in FIG. 3 (triangles). FIG. 4 shows the mean droplet diameter cubed versus time for decane in FA emulsions with surfactants wherein the circles indicate E7GP29E76, the triangles indicate E20P70E20, the squares indicate E3P43E3, and the dashed line indicates a slope of unity. The linear relationship was indeed found. This does not yet prove that droplet growth is really Ostwald ripening because in an aggregation/coalescence process the aggregation step is also second order (and coalescence is first order). For the E3P43E3 emulsion which began to break already after 23 hours, however, the relation was nonlinear and was more reminiscent of a first order coalescence process. For E76P29E76, stable for 65 hours, the relation was again linear, but the growth rate was much larger.

Figure 5:
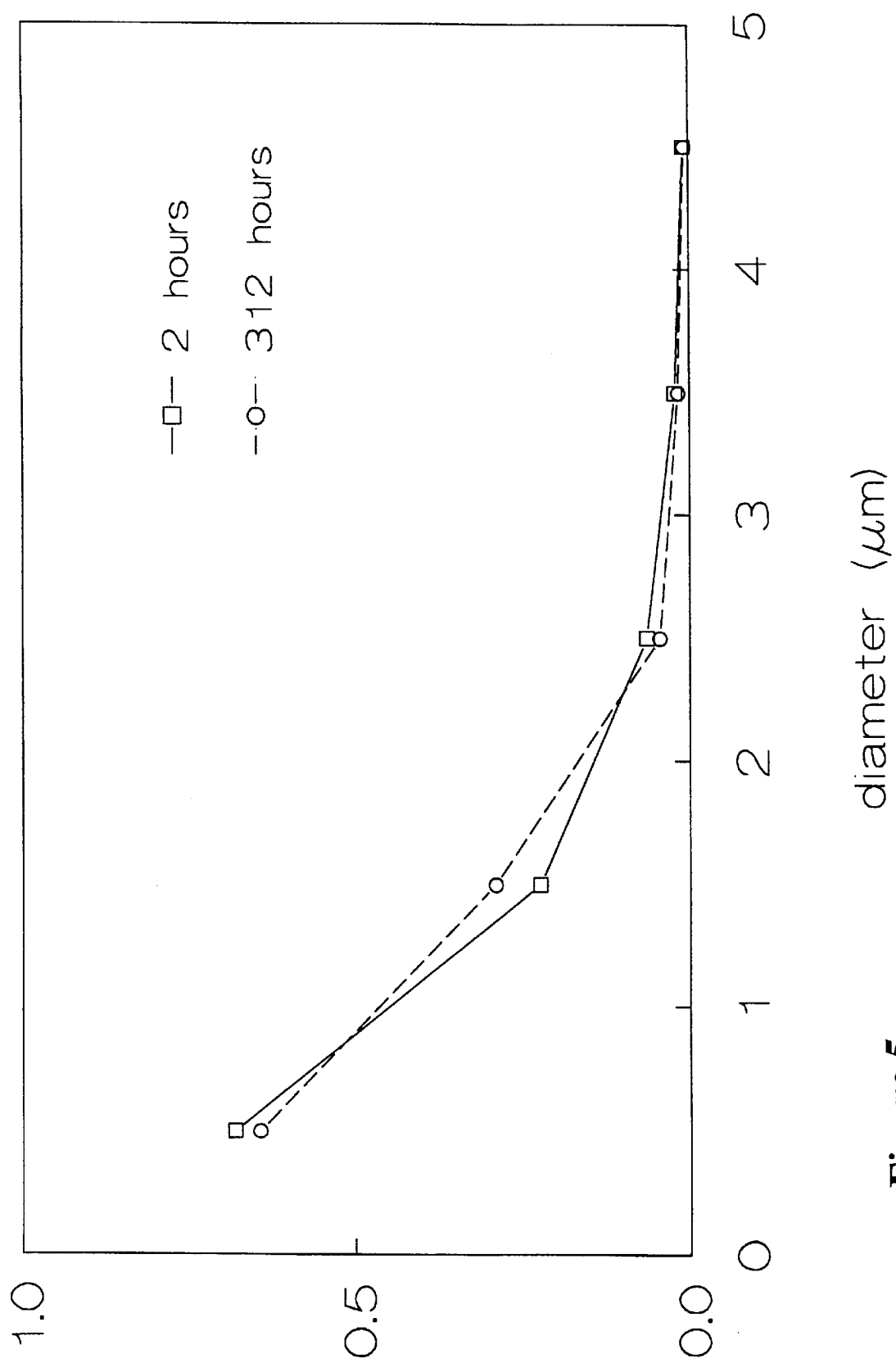
FIG. 5 is a plot showing the droplet size distributions of decane+1% silicon oil emulsion in FA at different aging times.

The strongest indication that droplet growth in FA emulsions involves Ostwald ripening was that it can be arrested by adding a trace of a material that is oil soluble but which have very low solubility on the polar liquid. Such a material will be relatively heavy compared to the oil phase. See Higuchi et al., supra; Davis, S. S., Round, H. P.; and Purewal, T. S., *J. Colloid Interface Sci.* 80, 508 (1981). In this case we added 1% w/w of silicon oil to the decane. FIG. 5 shows the droplet size distributions of decane and 1% silicone oil in FA at different aging times, and that the droplet size distribution no longer grows with time. This is caused by the fact that, as the small droplets begin to 'evaporate', they are enriched in silicone oil which cannot leave the droplet. Large droplets grow, so that their silicone oil is diluted. This sets up a chemical potential difference opposite to the Laplace effect and brings the ripening process to a halt. Indeed, we were able to prevent ripening in emulsions of the lower alkanes isooctane and hexane in the same way.

Since Ostwald ripening proved to be so important in these nonaqueous emulsions, we reexamined the time until breaking of emulsions with 1 wt % of silicone oil added to the oil phase. In Table IV we show the new results for the non-polymeric surfactants.

TABLE IV

Time until braking in hours for nonaqueous emulsions with 1 wt. % of silicone oil added to decane. Other compositions are the same as in Table II.

| surfactant | FA | NMF | DMSO |
|---|---|---|---|
| Brij 52 | >500[a] | 0 | 0 |
| Brij 52/Igepal CO-520 = 20:1 | 2[a,b] | | |
| Brij 52/Igepal CO-520 = 1:2 | 0.07[b] | | |
| Igepal CO-520 | 50 | 0 | 0 |
| Igepal CO-520/Triton X-100 = 1:1 | 80 | | |
| Triton X-100 | 18 | 0 | 0 |
| Triton X-100/Igepal CO-890 = 2:1 | 32 | | 0.75 |
| Triton X-100/Igepal CO-890 = 1:2 | 50 | 0.05 | 0.90 |
| Igepal CO-890 | 37 | 0.017 | 0.60 |
| Igepal CO-890/Igepal CO | 35 | 0.04 | 1.25 |
| Igepal CO-990 | >500 | 0 | 1 |

[a]W/O type emulsion.
[b]Forms a microemeulsion.

For DMSO and NMF there is no improvement, so Ostwald ripening is not the rate determining process in emulsion breakup for these liquids. Some of the FA emulsions, on the other hand, show a clear improvement in stability. These data are plotted as triangles in FIG. 2 to compare them with the situation without silicone oil. It is clear that Ostwald affects emulsion stability at HLB numbers between 10 and 13. A stability maximum now appears at around HLB=12, in agreement with Cameron et al., supra. The overall trend of increasing stability with surfactant size remains. Emulsions with Igepal CO-990 (HLB=19.1) do not show any breaking at all anymore. This is probably an effect again of the large molecular size which stabilizes droplets against coalescence. Indeed, examining the new results for the polymeric surfactants in Table V it is seen that these emulsions are very stable.

TABLE V

Time until breaking in hours for nonaqueous emulsions with triblock copolymers containing 1 wt. % of silicone oil added to decane. Other compositions are the same as in Table II.

| surfactant | FA | NMF | DMSO |
|---|---|---|---|
| E3P43E3 | 70 | 0.017 | 6 |
| E3P43E3/E20P70E20 = 3:1 | >1000 | | 40 |
| E3P43E3/E20P70E20 = 1:1 | >1000 | 0.025 | >1000 |
| E3P43E3/E20P70E20 = 1:3 | >1000 | | >1000 |
| E20P70E20 | >1000 | 0.033 | >1000 |
| E20P70E20/E76P29E76 = 3:1 | >1000 | | >1000 |
| E20P70E20/E76P29E76 = 1:1 | >1000 | 0.033 | >1000 |
| E20P70E20/E76P29E76 = 1:3 | >1000 | | >1000 |
| E76P29E76 | 77 | 0 | 40 |

Most specifically, DMSO emulsions stabilized with PEO-PPO-PEO become stable indefinitely when the oil contains a trace of silicone oil. No change is observed with NMF; neither do emulsions with DMF, methanol and acetonitrile become stable by adding silicone oil.

Figure 6:
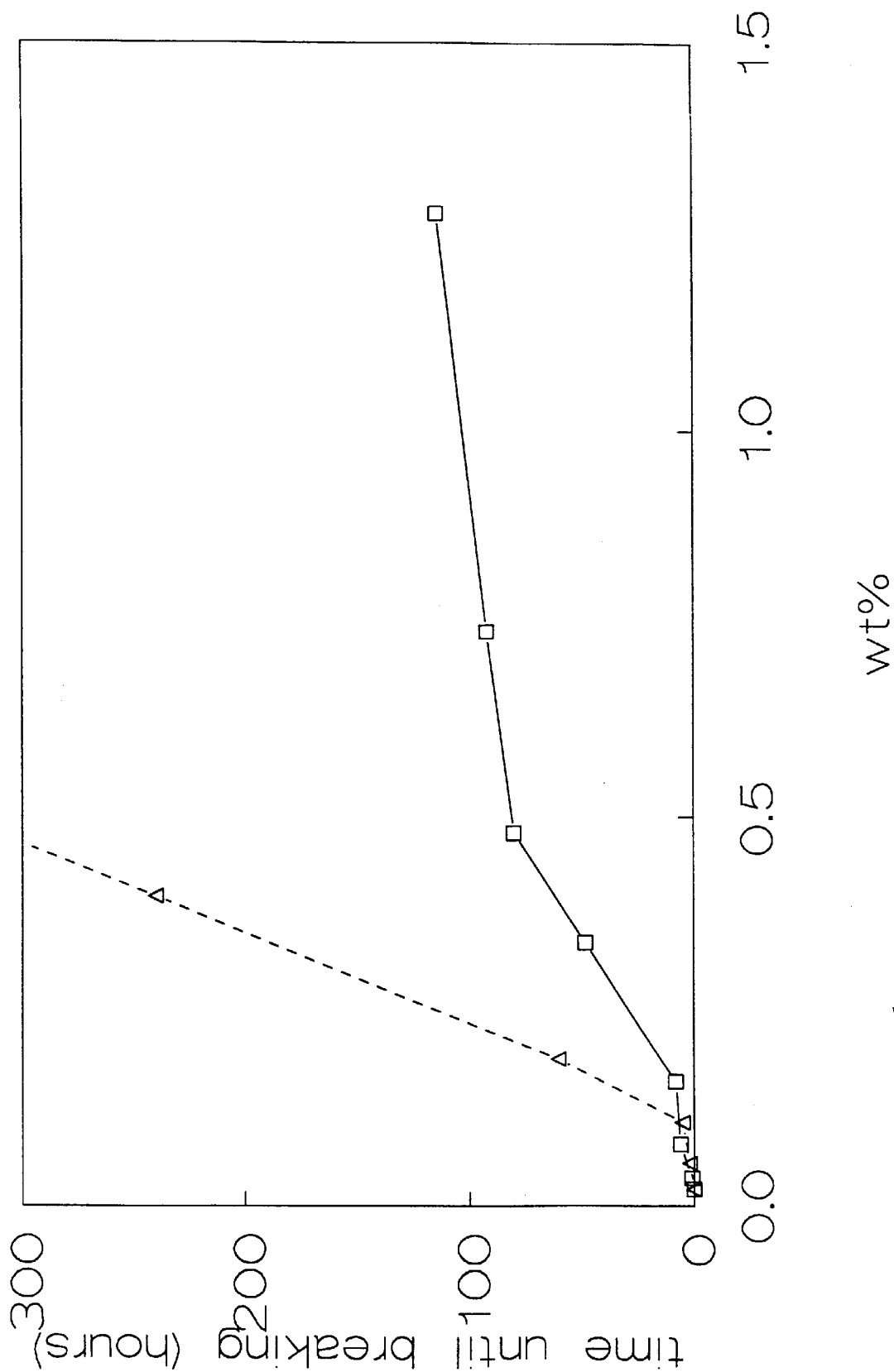
FIG. 6 is plot of time until breaking of decane in FA emulsions vs. surfactant weight concentration (relative to formamide+surfactant) wherein the squares indicate pure decane, and the triangles indicate decane+1% silicone oil.

In FIG. 6 there is shown the time until breaking for an emulsion in FA stabilized with increasing E20P70E20-concentrations, both with and without the 1% silicone oil (squares indicate pure decane; triangles indicate decane +1% silicone oil). When Ostwald ripening is prevented, E20P70E20 is a very good surfactant even at low concentrations. No breaking occurs anymore above ~0.5 wt. %. When no silicone oil is added the increase in stability with concentration is much more gradual. Higher surfactant concentrations therefore seem to slow down the destabilizing action of Ostwald ripening, but do not stop it.

Thus, Oswald ripening has a strong influence on the stability of nonaqueous emulsions. The rate of ripening for the FA emulsion with E20P70E20, which is otherwise completely stable against coalescence, is 0.5 $\mu m^3/h$ (FIG. 4). This is much higher than the value $8.3 \times 10^{-4}$ $\mu m^3/h$, reported for a 10 vol % decane in water emulsion stabilized with 0.1 M SDS (see Kabalnor et al., supra) even when the difference in oil volume fraction is taken into account. (This increases the rate by roughly a factor of two when going from 10% to 50% of oil). See Voorhees, P. W., J. Stat. Phys. 38, 231 (1985). The faster ripening rate is probably due to a higher solubility of the oil in the nonaqueous liquid than in water. Solubility data for decane in FA are not available. The solubility of decane in DMSO is 0.7 g/100 g versus $1.5 \times 10^{-6}$ g 100 g for water. See Shaw, D. G.(Ed.), "Hydrocarbons is Water and Seawater Part II. Hydrocarbons C8 to C36", Solubility Data Series Vol. 38, Pergamon, Oxford, 1989. This explains the very short stability time of DMSO emulsions without the silicone oil. It seems likely, therefore, that the nonaqueous emulsions in earlier reports (Periard et al., supra; Cameron et al., supra) which were stable for at most 24 hours, could also be made significantly more stable by the addition of a trace component to the droplet phase that is very insoluble in the continuous phase.

Finally, there remains the question why one polar liquid can form stable emulsions with conventional surfactants and the other cannot. It seems likely that the liquid has to resemble water in its structural properties and/or in its ability to solvate the surfactant. Formamide comes closest to this requirement (Table I) and indeed forms the most stable nonaqueous emulsions. It is both a strong donor and acceptor of hydrogen bonds. When moving to N-methylformamide, the hydrogen bonding donating ability decreases and also the number of possible H-bonds per molecule is one instead of two. The H-bond accepting ability and permittivity are higher, however. Since NMF does not form stable emulsions for longer than a few minutes the requirement of strong H-bond donating ability seems to be the decisive factor. This is confirmed by the complete inability of DMF and acetonitrile to form emulsions. It can be understood since the nonionic surfactants used contain a chain of —$CH_2CH_2$—O— units which can accept these H-bonds. However, the conclusion is completely at odds with the observation that DMSO, being only an H-bond acceptor, can form very stable emulsions. Therefore, a discussion in terms of polarity and solvating parameters alone is insufficient to explain or predict the emulsifying power of a polar liquid.

Stable concentrated oil-in formamide and oil-in-dimethylsulfoxide emulsions could be prepared using commercially available nonionic surfactants. The most effective surfactants were the triblock copolymers PEO-PO-PEO. Owing to their relatively large size they could stabilize FA and DMSO emulsions against breaking practically indefinitely. FA emulsions could also be stabilized reasonably well (2 or 3 days) with polyoxyethylene alkylphenols with an optimum HLB number of around 12. Ostwald ripening was shown to be a very important factor in the stability of these nonaqueous emulsions since the process is considerably faster than in aqueous systems. As indicated Ostwald ripening could be completely arrested by dissolving in the oil a small amount, e.g. from 0.1 to 5 wt %, preferably about 1 wt %, of a compound with a very low solubility in the polar liquid. This is necessary in order to obtain completely stable emulsions.

Materials other than those specifically identified can be used. In place of formamide, one can use DM50 or for certain sol-gel processes, such as those used to produce silicon dioxide, one can use water. In place of the silicone oil, one can use any long chain hydrocarbon oil. The oil phase can be a light hydrocarbon such as decane or iso-octane, preferably an alkane of from 8 to 20 carbon atoms.

Sol-gel Processing

The sol-gel process conducted in implementing the invention utilizes inexpensive chemicals which are all commercially available and can be used as received.

We make use of a variety of metal alkoxides. Since this class of chemicals is extremely water sensitive most of them must be shielded from water during emulsion processing until the time of gelation. Therefore, it is often important to start with a nonaqueous emulsion, i.e. one in which the water is replaced by another polar liquid. Stable nonaqueous emulsions were obtained using formamide (FA) or dimethylsulfoxide (DMSO) as the polar component, and the class of surfactants known as the triblock copolymers polyoxyethylene polyoxypropylene-polyoxyethylene (EPE), described above. We chose an EPE with a molecular weight of 5800 and containing 30% by weight of ethyleneoxide monomer since that surfactant imparted maximum stability to the emulsion against demixing. The oil may be any apolar liquid as long as it is sufficiently immiscible with FA and DMSO (less than about 1%). We usually chose isooctane or decane since these oils can be removed relatively easily by evaporation. The oil was mixed with 1% of silicone oil by weight in order to stabilize the emulsion against Ostwald ripening. The emulsion is then produced by mixing polar liquid, oil, and surfactant together in the desired amounts using a suitable emulsification method, for example in a homogenizer. The particular emulsification method sets the initial distribution of droplet sizes. Further refinement can be effected by an emulsion fractionation procedure, which is well documented in the literature. See J. Bibette, J. Colloidal Interface Sci. 147, 474 (1991); and J. Bibette, French Patent No. 90/01990 (1990).

After the desired droplet size and size distribution is obtained the emulsion is mixed with the ceramic precursor dissolved in the polar liquid. The way in which this solution is made depends somewhat on the alkoxide of one's choice. Three examples will be given, which lead to respectively, titanium dioxide, zirconium dioxide, and silicon dioxide ceramics. Other oxides and mixed metal oxides can be prepared in an analogous way. For example, one could use the process with barium titanate ($BatiO_3$), lead titanate ($PbToO_3$) or La 1–x $Sr_xMnO_3$.

Titanium tetraisopropoxide is treated with an equimolar amount of the chelating agent 2,4 pentanedion to reduce its reactivity toward water. See Sanchez, C., Babonneau, F., Doeuff, S. & Leaustic, A. in Ultrastructure Processing of Advanced Ceramics (eds. Mackenzie, J. D. & Ulrich, D. R.) 77–87) Wiley, N.Y., 1988). It is then mixed rapidly with a mixture of water and FA, in which water is the minor component. The molar ratio water/titanium should be between 2 and 15. The equivalent weight concentration of TiO2 is typically around 10%. A clear yellow solution results in which the titanium alkoxide is partially hydrolysed but does not precipitate. It contains a considerable fraction of isopropanol produced in the hydrolysis reaction. Since alcohols were found to have a deleterious effect on the emulsions isopropanol is largely removed by twice extracting the yellow solution with a large excess (ca. fivefold) of a lower alkane, i.e. hexane. After that, the liquid will frequently be turbid. The mixture is briefly heated to ca. 90° C. This results in a clear yellow, slightly viscous titania precursor solution, which does not form a precipitate for several weeks.

A zirconia precursor solution is prepared in a way completely analogous to the one for titania, starting with zirconium tetra-n-butoxide (70% in n-butanol). A silica precursor solution is prepared by vigorously mixing silicon tetramethoxide with a mixture of water and FA which has been acidified to a pH of around 2 and contains a least a fourfold excess of water relative to silicon. The resulting clear and colorless solution typically contains the equivalent of 10% by weight of silicon dioxide.

The ceramic precursor solution is then mixed with the emulsion as prepared above. The precursor concentration is adjusted to the desired value (this determines the degree of shrinkage in the final ceramic). Also, the volume fraction of oil droplets is adjusted to the desired porosity by either dilution with the precursor solution or by concentration using, for example dialysis or centrifugation.

The gelation is then induced by addition of a small amount of an aqueous base. Concentrated (30%) ammonia proved the most suitable. The amounts of ammonia and water relative to titanium are used to determine the gelation time which can vary in the range of seconds to many hours. The gelation time should allow ample time for further processing.

The emulsion is then cast into the mold (of any desired shape or size) and allowed to come to rest. In the case of monodisperse emulsions a colloidal polycrystal will spontaneously form by self-assembly as a result of Brownian motion of the particles and their interactions Crystallization may be promoted in any known way (for example by inducing a shearing flow or by manipulating the droplets with electric fields).

After gelation takes place the gel is aged for a day or more (depending on the starting alkoxide, its concentration, and the concentration of added base), which allows it to become more interconnected and stronger. This process can be accelerated by storing the gel at a slightly elevated temperature (e.g. 50° C.). When the gel has become sufficiently strong it will have shrunk slightly (syneresis).

The gel is now washed extensively by placing it in an excess volume of tetrahydrofuran or a lower alcohol, e.g., ethanol. This replaces most of the FA or DMSO which are very hard to remove through evaporation. Moreover, it also dissolves the oil droplets (and surfactant). This is favorable since it prevents the build-up of stresses inside the gel during the drying step which entails considerable shrinkage. Washing is repeated several times and each time the gel is given time to exchange its pore fluids with the washing liquid. The gel is then dried at room temperature or at a slightly elevated temperature. Slower drying generally reduces the risk of cracking of the gel. Alternatively, the gel can be dried supercritically in order to prevent cracking.

Further processing of the ceramic includes the usual heat treatment during which any remaining adsorbed solvents are evaporated and any residual organic material left behind in the amorphous gel is burned off. This process is completed below 400° C. in a furnace. The gel has then typically lost about 30% of its initial weight. Alternatively, the wet gel can be treated hydrothermally in water. This also allows the gel to lose organics and crystallize at more modest temperatures.

The product is calcined at elevated temperatures to obtain the ceramic with the desired microstructure. This can be either crystalline or amorphous. In the case of titanium dioxide, for example, the temperature allows one to choose between the anatase (<700° C.) and rutile (>800° C.) crystal structures. Silica remains amorphous to much higher temperatures. The large pores (0.1–10 $\mu$m) retain their spherical shape and their packing even at temperatures exceeding 1000° C. Only the material in, the interstitial regions is densified at this temperature. At lower temperatures the nanopores in the interstitial regions can also be retained, which is important in catalytic applications, for example.

While this invention is illustrated with titanin, zirconia and silica, there would be no major difficulties in extending it to other oxides and to binary metal oxides, or more complex mixtures.

Sol-Gel Example

Figure 7A:
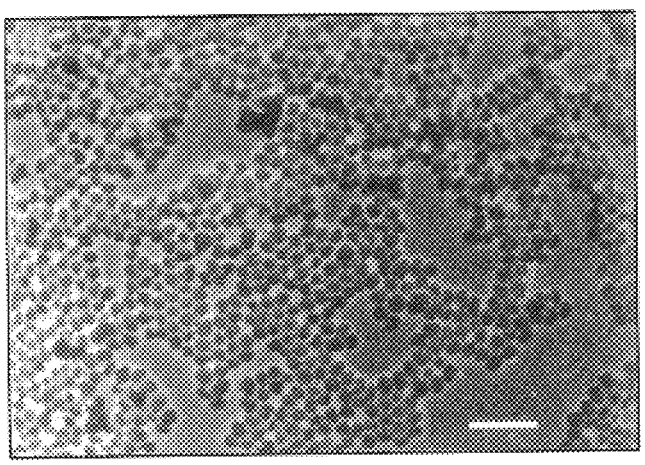
FIGS. 7(a),(b) and (c) are scanning electron micrographs of porous titania produced in an almost monodisperse emulsion showing honeycomb structures.
Figure 7B:
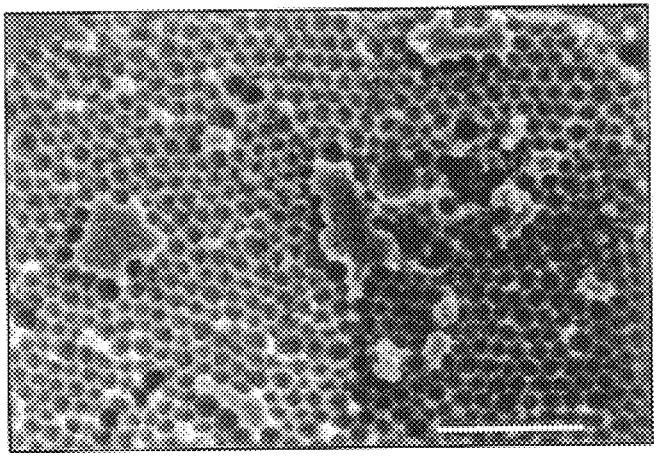

The pore structure of the emulsion-templated titania dried at 60° C. for two weeks, as observed under a scanning electron microscope (SEM), appears in FIG. 7(a). The pores are very uniform with an average diameter of 175 nm and show a high degree of order. Scale bars are 1 $\mu$m. The original emulsion had a polydispersity of 10% and an oil volume fraction of 55%. During the drying stage the linear dimensions of the gel shrank by as much as 50%. Thus, the original droplets had a diameter of approximately 350 nm. At this point the dried gel still contains a significant amount of organic material which keeps the metal oxide in an amorphous state. Ceramics are commonly given a heat treatment to remove all organics. The large featureless patches are regions where the pores were not exposed after breaking the sample. An SEM picture of the same sample after heating at 1000° C. for two hours in seen in FIGS. 7(b) and (c). The hexagonal pore structure is fully retained, but the pores have shrunk to 145 nm. X-ray diffraction produced the spectrum of TiO2 crystallized in the rutile structure of about 50 nm in size.

Figure 7C:
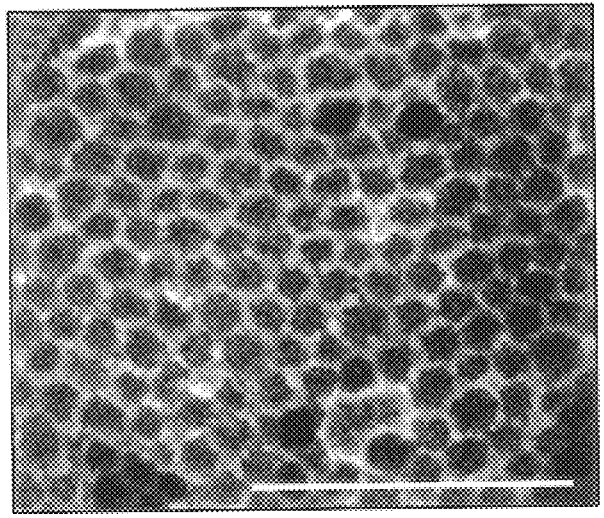
Figure 8A:
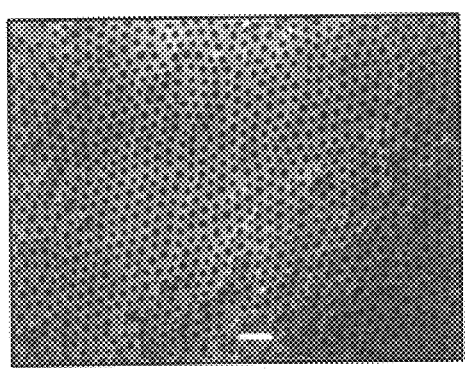
FIGS. 8(a) and (b) are scanning electron micrograph images of porous titania calcined at 1000° C. prepared from two slightly different emulsion fractions.

Next we demonstrated the control over pore size of our technique. In FIGS. 8(a) and (b), we compare SEM images of porous titania calcined at 1000° C., made from two slightly different emulsion fractions. Scale bars are 1 $\mu$m. The pores are almost touching but the difference in appearance of these picture with those of FIG. 7 is caused by the fact that the surface "decapitated" the pores, whereas in FIG. 7 it cut the pores almost exactly in half.

Figure 9:
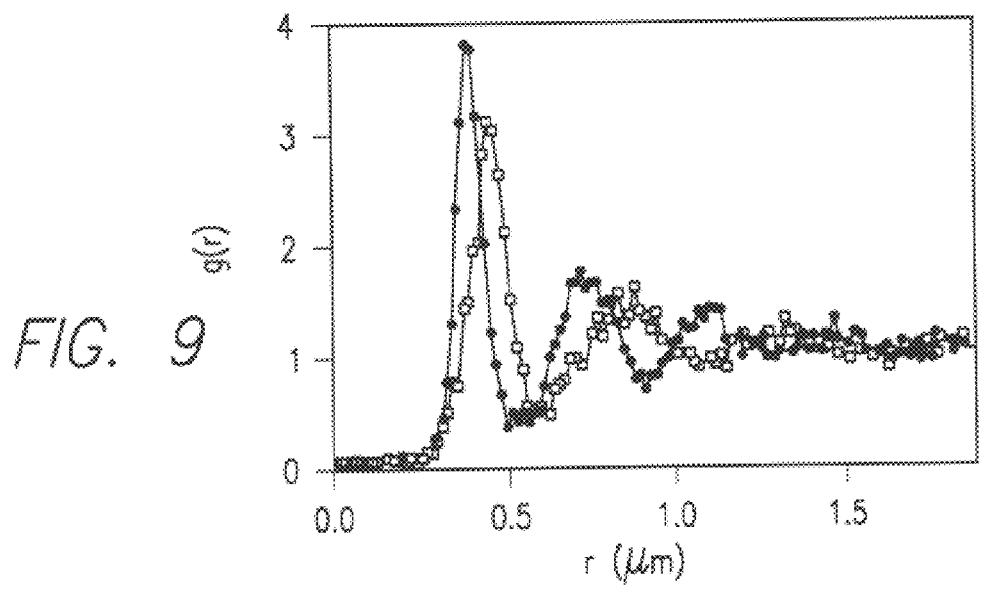
FIG. 9 is a plot of the radial distribution functions of the pore centers in the above images calculated by computer image analysis, peaking at an average inter-pore distance of 0.377 and 0.435 $\mu$m, for images (a) (filled circles) and (b) (open squares) respectively of FIG. 8.

Referring to FIG. 9, by computer image analysis, we obtained the radial distribution function g(r) of the pores which peak at an average interpore distance of 0.3777 $\mu$m and 0.435 $\mu$m, respectively, for the images in FIGS. 8(a) and (b). This function represents the chance of finding the center of a pore at a distance r from the center of another pore, relative to that of a completely homogeneous distribution. The half-widths at a half maximum of the first peak are 0.043 and 0.060, respectively. These values are upper limits because the spread in interpore distance is increased by the slight buckling of the surfaces seen in the pictures. The high degree of long range order is reflected in a series of peaks. Note that there are three peaks clearly evident in each of the radial distribution functions (with evidence of a fourth peak) indicating a high degree of local crystalline order. The average nearest-neighbor distance is given by the location of the first peak, and the width of this peak is a measure for the spread. These results show that we were able to make materials with a well-defined pore size difference of about 20%.

Figure 10:
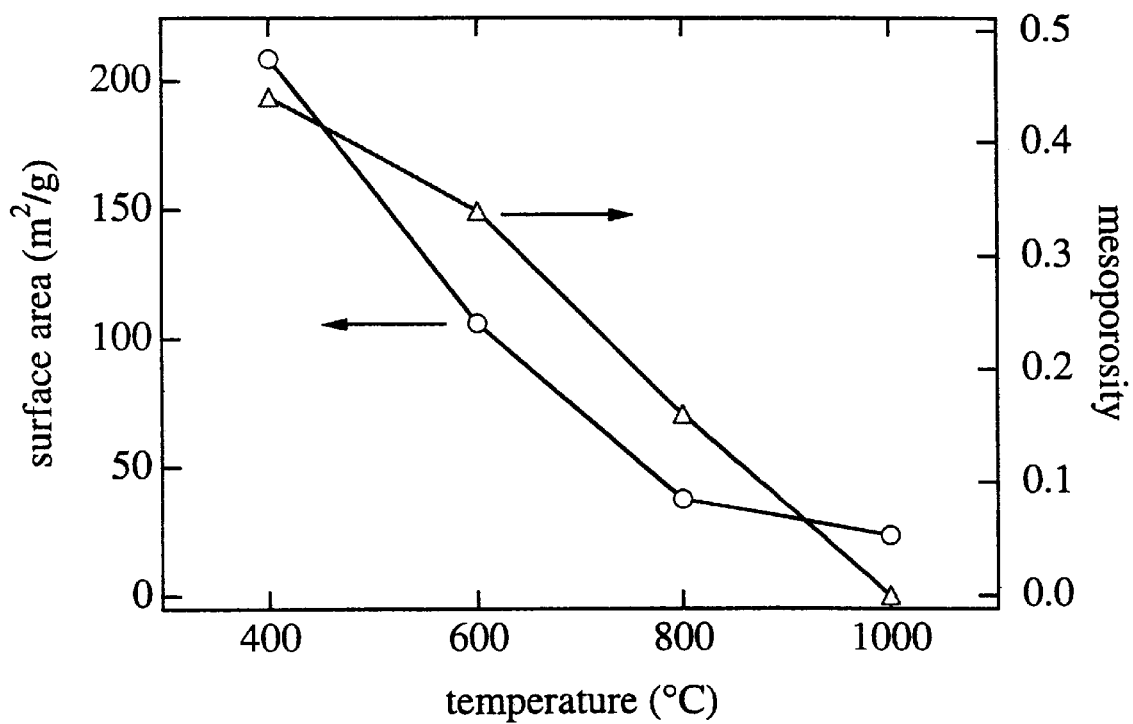
FIG. 10 is a plot of Brunauer-Emmett-Teller specific surface (circles) and mesoporosity (triangles) of titania produced in a polydisperse emulsion plotted versus calcination temperature (2 hours in air, heating rate 15° C./min)

That the macropore structure is unaffected by the heat treatment is all the more remarkable if one considers the changes that take place on a smaller length scale. Detailed analysis of these changes was made on similarly prepared porous titania starting with a nonuniform emulsion. Samples were heated to different temperatures for two hours and analyzed. X-ray powder diffraction spectra showed that between 400 and 800° C. the crystal structure was that of anatase and that it recrystallized to rutile at higher temperatures. Thermogravimetric analysis showed that 90% of the weight loss takes place below 300° C. Loss is complete at 500° C. when the gels have lost 30–35% of their initial weight. Nitrogen sorption isotherms were measured to investigate the densification of the titania matrix. The data is shown in FIG. 10 and were obtained from nitrogen sorption isotherms on a Micrometrics ASAP 2000 adsorption instrument using standard procedures. The mesoporosity is the volume fraction of all pores smaller than 50 nm and therefore does not include the macropores. From the isotherms, the total internal surface area and the total volume of pores smaller than about 50 nm is derived. After calcination at 400° C. both the high mesoporosity (44%) and the large internal surface (208 m²/g) indicate that the titania matrix is in itself a very open structure. The data demonstrate that the titania matrix contained mesopores of 2–10 nm over most of the temperature range (type IV isotherms). Only the sample treated at 1000° C. had a type II isotherm indicative of a nonporous material. Thus, the data indicate that calcination at 1000° C. results in strong densification of the titania matrix. Such control over densification is very relevant. In applications such as catalysis and sorption, high porosity and internal surface area improve efficiency. Macropores facilitate material transport to mesoporous internal regions where reactions can take place. In contrast, for optical applications, it is desirable for the matrix to be as dense as possible in order to achieve maximal contrast in the refractive index between the matrix and the macropores. See Soukoulis, C. *Photonic Band Gap Materials* (Kluwer, Dordrect, 1996).

Figure 11A:
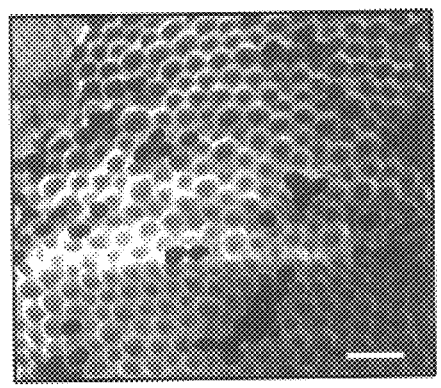
FIGS. 11(a) and (b) are scanning electron micrographs of emulsion templated materials in (a) zirconia after heating at 1000° C. in air for 2 hours, having a pore size of 0.35 $\mu$m, and in (b) silica with pores of 1.0 $\mu$m produced in a polydisperse emulsion after heating at 600° C. for 2 hours.
Figure 11B:
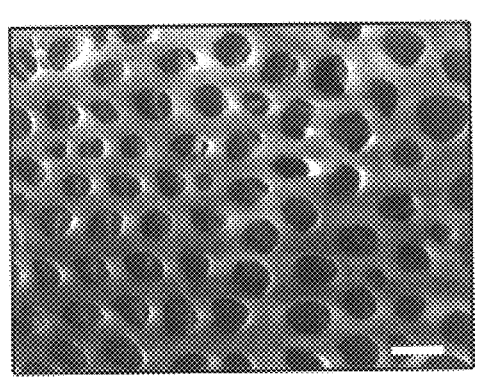

One important advantage of the emulsion templating process of this invention is that it can be used to produce porous structures in many different materials. This allows one to tailor the chemical, electrical, magnetic, and optical properties. FIGS. 11(*a*) and (*b*) illustrate the choice of materials, by SEM pictures of, respectively, macroporous silica and zirconia. In both cases ordered pores were obtained even after calcination at elevated temperatures. In FIG. 11(*a*), zirconia, after being heated at 1000° C. for two hours, had a pore size of 0.35 μm. In FIG. 11(*b*) silica with pores of 1.0 μm were produced in a polydisperse emulsion after heating at 600° C. for two hours, and had a porosity of 89% as calculated from the density of the material. Since this is above the maximum packing fraction of spheres, the droplets have deformed which resulted in a connected set of pores. This allows one to look some way into the porous structure. Scale bars are 1 μm.

Figure 8B:
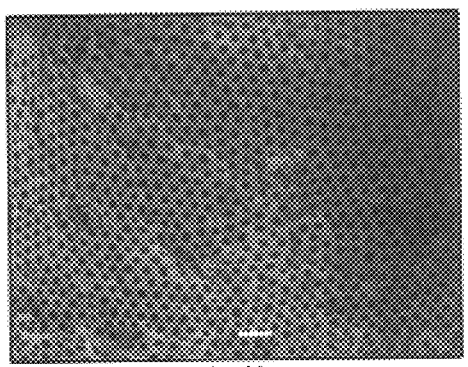

Templating of nonaqueous emulsions is a versatile and inexpensive technique to produce ordered macroporous ceramics of many different materials. Using even more monodisperse emulsions we will be able to make structures as in FIGS. 7 and 8 with even longer-ranged order. This can be combined with recently developed techniques to nucleate colloidal crystals on surface microstructures such as described in Dinsmore, A. D., Yodh, A. G. and Pine, D. J. Entropic Control of Particle Motion Using Passive Surface Microstructures *Nature* 383, 188–189 (1980), and van Blaaderen, A., Ruel, R. and Wiltzius, P. Template-Directed Colloidal Crystallization Matire 395, 321–324 (1997), the teachings of which are incorporated herein by reference. It can also be combined in the preparation of binary alloy structures, as described Hachisu, S. and Yoshimura, S. Optical Demonstration of Crystalline Superstructures in Binary Mixtures of Latex Globules. Nature 283, 188–189 (1980), and Bartlett, P., Ottewill, R. H. and Pusey, P. N. Superlattice Formation in Binary Mixtures of Hard-Sphere Colloids., *Phys. Rev. Lett.* 68, 3801–3804 (1992)the teachings of which are incorporated herein by reference.

What is claimed is:

1. A method for making macroporous ceramics, comprising:
    forming an aqueous or nonaqueous emulsion in which the polar phase thereof is an oil-immiscible polar liquid whereby to form macro size aqueous or nonaqueous droplets in said polar phase;
    thereafter, adding a ceramic precursor to said emulsion and adding a base sufficient to induce gelation of said ceramic precursor under conditions whereby said droplets serve as templates around the exterior surface of which said ceramic precursor is deposited;
    drying the resultant gel; and
    calcining the dried gel.

2. The method of claim 1 wherein the emulsion is nonaqueous.

3. The method of claim 2 wherein the nonaqueous emulsion is an oil in formamide emulsion.

4. The method of claim 1 in which said emulsion has been stabilized by the incorporation of a surfactant.

5. The method of claim 4 in which a small amount of heavy oil soluble material that is oil soluble but which has very low solubility in the polar liquid is added to the oil phase of the emulsion.

6. The method of claim 5 in which said added material is silicone oil.

7. The method of claim 4 in which said surfactant is a triblock polymer of the formula (ethylene osxide)$_n$-(proxylene oxide)$_m$-(ethylene oxide)$_n$ wherein 2 n/m is a value from 0.3 to 0.4.

8. The method of claim 1 in which said oil is an alkane of from 8 to 20 carbon atoms.

9. The method of claim 8 wherein said alkane is isooctane.

10. The method of claim 8 wherein said alkane is decane.

11. The method of claim 8 wherein said alkane is hexane.

12. The method of claim 2 wherein said ceramic percursor is a metal oxide.

13. The method of claim 12 in which said metal oxide is selected from titanium dioxide, zirconium dioxide and silicon dioxide.

14. The method of claim 1 in which said emulsion is fractionated to obtain a desired size and distribution of emulsion droplets.

15. A method for making macroporous ceramics, comprising:
    forming an emulsion of an alkane in formamide; which also contains a surfactant and, in its oil phase, a small amount of oil-soluble material that is oil soluble but which has very low solubility in formamide;
    thereafter, adding a metal oxide to said emulsion and adding a base sufficient to induce gelatin of said metal oxide, under conditions whereby said droplets serve as templates around the exterior surface of which said ceramic precursor is deposited;
    drying the resultant gel; and
    calcining the dried gel.

* * * * *